(12) United States Patent
Parker et al.

(10) Patent No.: US 8,942,669 B2
(45) Date of Patent: Jan. 27, 2015

(54) TIERED-BASED BILLING FOR CONTENT DELIVERY

(71) Applicants: Verizon Patent and Licensing Inc., Basking Ridge, NJ (US); Cellco Partnership, Basking Ridge, NJ (US)

(72) Inventors: Benjamin J. Parker, Foster City, CA (US); Phillip A. Ritter, Danville, CA (US); Chris S. Neisinger, Danville, CA (US); Barry F. Hoffner, Bridgewater, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 232 days.

(21) Appl. No.: 13/705,743

(22) Filed: Dec. 5, 2012

(65) Prior Publication Data
US 2014/0155025 A1 Jun. 5, 2014

(51) Int. Cl.
| | |
|---|---|
| H04M 11/00 | (2006.01) |
| H04W 4/26 | (2009.01) |
| H04M 15/00 | (2006.01) |
| H04L 12/14 | (2006.01) |
| H04L 25/14 | (2006.01) |
| H04W 4/24 | (2009.01) |

(52) U.S. Cl.
CPC ............ *H04W 4/26* (2013.01); *H04M 2215/32* (2013.01); *H04M 15/80* (2013.01); *H04L 12/14* (2013.01); *H04L 25/14* (2013.01); *H04M 2215/44* (2013.01); *H04L 12/1485* (2013.01); *H04W 4/24* (2013.01); *H04M 2215/46* (2013.01); *H04M 2215/22* (2013.01)

USPC ........... 455/406; 455/405; 455/407; 455/408; 455/409; 455/3.06; 455/454; 455/524; 455/525

(58) Field of Classification Search
CPC ......... H04W 4/24; H04W 4/26; H04W 88/06; H04W 76/02; H04W 36/0011; H04L 12/14; H04L 12/1485; H04L 12/1403; H04L 12/1435; H04L 12/1475; H04L 12/1407; H04L 12/5895; H04M 15/00; H04M 2215/32; H04M 15/80; H04M 15/61; H04M 15/8016; H04M 2215/92; H04M 15/44; H04M 15/765; H04M 15/81; H04M 2215/0112; H04M 15/31; H04M 15/8083; H04M 2215/22; H04M 2215/46; H04M 15/66; H04M 15/8228; H04M 2215/44; H04M 17/10

USPC ................ 455/405–409, 3.06, 454, 524, 525
See application file for complete search history.

(56) References Cited

U.S. PATENT DOCUMENTS 6,138,158 A * 10/2000 Boyle et al. .................... 709/225
7,224,964 B2 * 5/2007 Souissi et al. ............... 455/414.4
(Continued)

*Primary Examiner* — Olumide T Ajibade Akonai

(57) ABSTRACT

One or more servers may: receive information regarding a content file stored by a device; provide information associated with a first cost value corresponding to a cost to deliver the content file from the device to a user device; receive a delivery instruction directing the one or more servers to provide a portion of the content file to the user device via one or more ports or via one or more access points, each of the one or more ports or the one or more access points being associated with respective one or more second cost values; generate a key associated with the information regarding the content file and with the delivery instruction; receive an indication of selection of the key by the user device; deliver, to the user device, the portion of the content file via the one or more ports or the one or more access points.

20 Claims, 7 Drawing Sheets

(56) References Cited

U.S. PATENT DOCUMENTS 7,917,129 B2 * 3/2011 Souisse et al. ............. 455/414.2
8,787,918 B2 * 7/2014 Pugliese ....................... 455/445
2013/0290555 A1 * 10/2013 Einarsson et al. ............ 709/231

* cited by examiner

| Key ID | Expiration | Content Information | | | Delivery Rate | Delivery Instructions | | |
| --- | --- | --- | --- | --- | --- | --- | --- | --- |
| | | URL | File Size | Resolution | | Time Index | Port | Customer Charge |
| 123 | 11/11/2012 | movielibrary.com/billymadison.mkv | 2.0 gb | 1920x1080 | $0.015/min | 00:00:00-00:01:00 | 1 | $0.00 |
| | | | | | | 00:01:01-01:30:00 | 2 | $0.025/min |
| 456 | 11/18/2012 | movielibrary.com/thematrix.mkv | 2.0 gb | 1920x1080 | $0.015/min | 00:00:00-00:01:00 | 1 | $0.00 |
| | | | | | | 00:01:01-01:30:00 | 3 | $0.05/min |

Fig. 4

TIERED-BASED BILLING FOR CONTENT DELIVERY

BACKGROUND

User devices sometimes connect with a network via a cellular network provider to receive content (e.g., video content, audio content, or some other content). Cellular network providers sometimes charge a user account, associated with the user device, based on usage of the cellular network (e.g., an amount of data transferred to and/or from the user device).

BRIEF DESCRIPTION OF THE DRAWINGS

FIG. 4 illustrates example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may permit a content owner to offer delivery, to a user device, of one or more particular content files (e.g., a video content file, an audio content file, a photo content file, etc.) at different billing rates for each particular content file (or a portion of a particular content file) via a network provider (e.g., a cellular network provider) associated with a network. For example, the network provider may charge the content owner different delivery rates for delivering different content files to a user device and the content owner may offer to provide the content files to the user device at different billing rates (e.g., customer charge rates) for each content file (e.g., a toll-free customer charge rate to the user device such that the delivery is paid by the content owner as part of a promotion, or a toll-paid customer charge rate to the user device such that the content owner receives a profit when the toll-paid rate exceeds the delivery rate charged by the network provider to the content owner).

Figure 1:
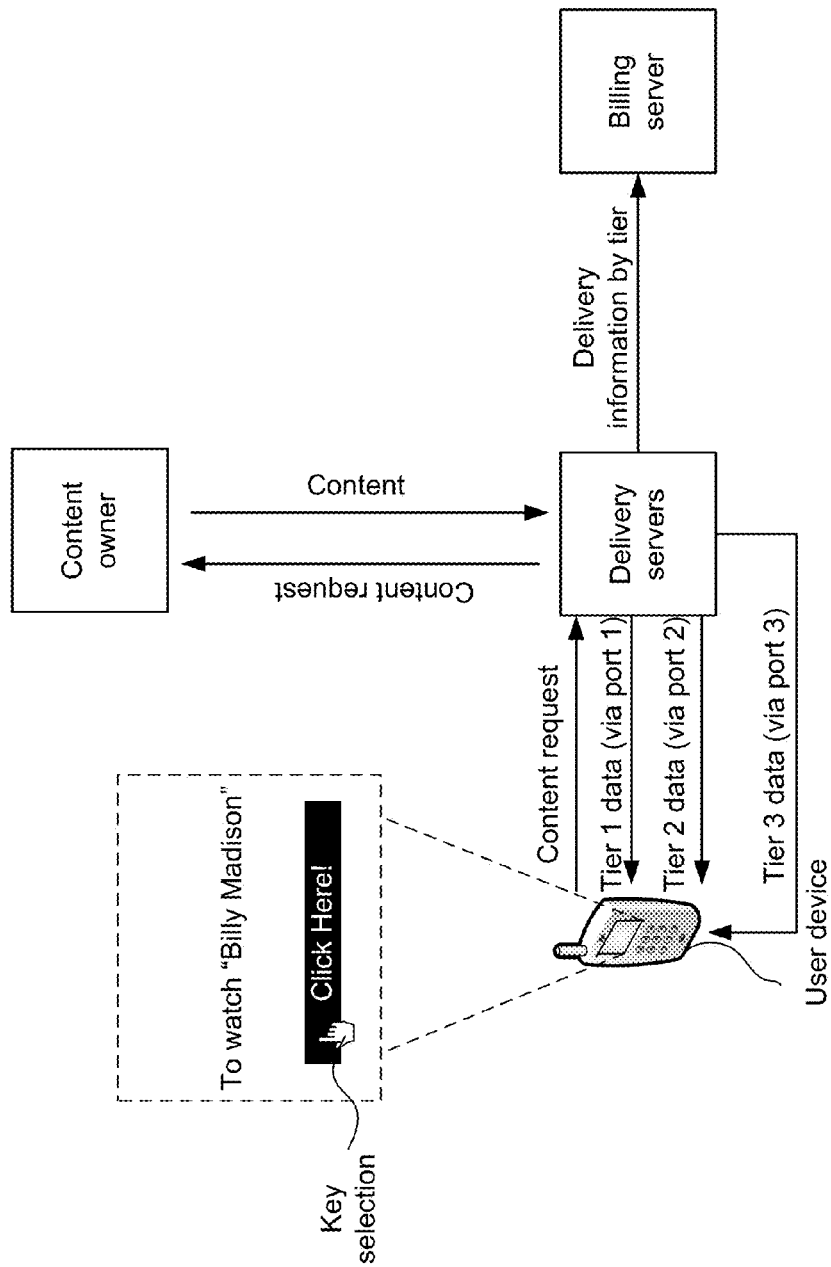
FIG. 1 illustrates an example overview of an implementation described herein.

FIG. 1 illustrates an example implementation as described herein. As shown in FIG. 1, assume that a user device requests a content file (e.g., a video entitled "Billy Madison") from a group of delivery servers associated with a network. In some implementations, the user device may request the content file by selecting a key (e.g., a link on a web page) identifying the content file. The delivery servers may request the content file from the content owner and may provide the content file to the user device via multiple ports based on information associated with the key. For example, the key may include instructions to cause the delivery servers to provide the portions of the content file to the user device user device via distinct ports (e.g. port 1, port, 2, port 3, or some other port). In some implementations, each port may correspond to different tiers corresponding to different customer charge rates charged by a network provider, for delivery of the content file, to an account associated with the user device.

Additionally, or alternatively, the instructions may cause the delivery servers to provide the content file to the user device via different access points, associated with respective access point names (APNs), of the network or different applications of the user device corresponding to different customer charge rates or billing tiers. For example, a first application of the user device may correspond to a first customer charge rate for a first billing tier and a second application of the user device may correspond to a second customer charge rate for a second billing tier. As shown in FIG. 1, the delivery servers may provide information regarding content file delivery by tier to a billing server. As a result, the account of the user device may be billed at different rates based on the delivery of data by tiers. In some implementations, the billing server may perform a billing settlement function to distribute billed charges to appropriate accounts (e.g., an account associated with the content file owner, an account associated with the user device, and an account associated with the network provider, etc.).

Figure 2:
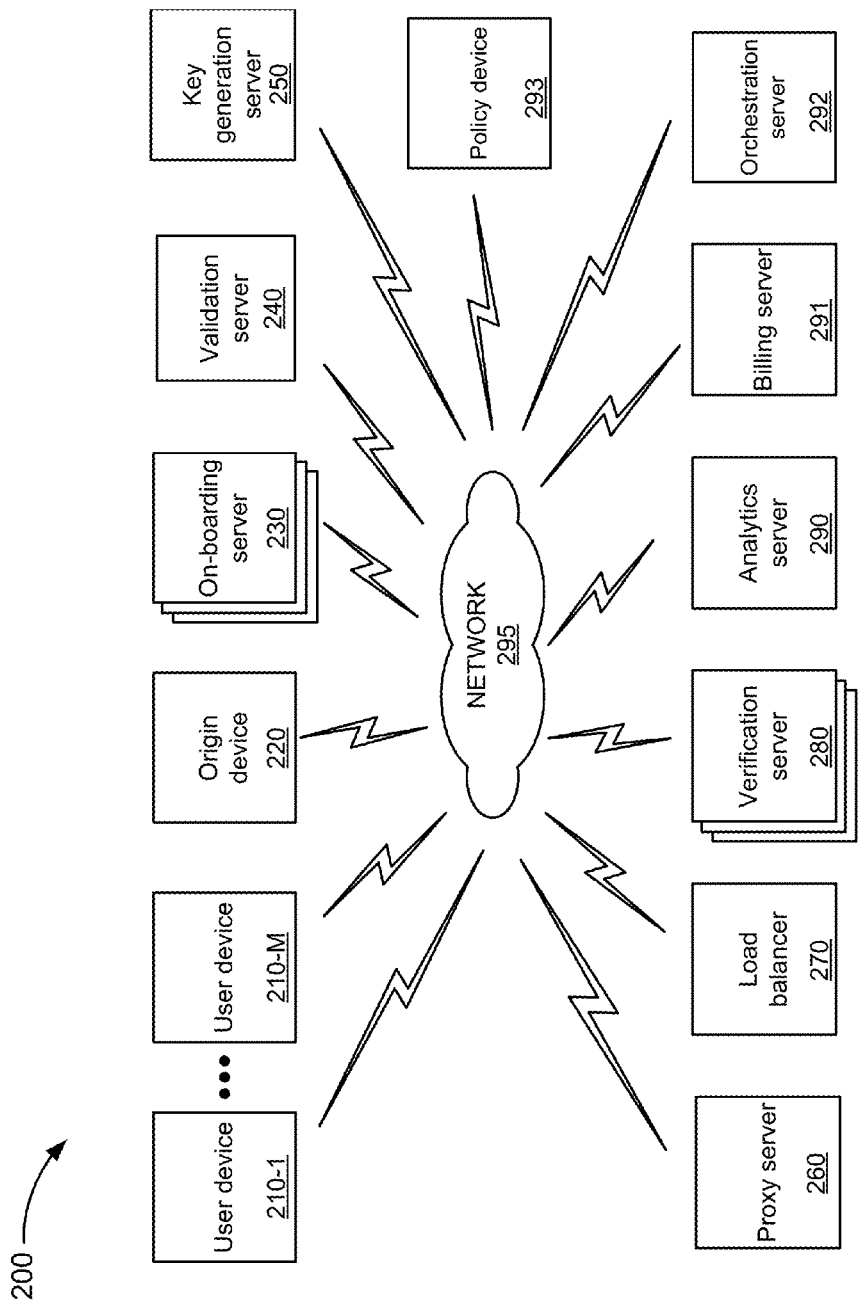
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210-1, . . . ,210-M (where M≥1), origin device 220, on-boarding server 230, validation server 240, key generation server 250, proxy server 260, load balancer 270, verification server 280, analytics server 290, billing server 291, orchestration server 292, policy device 293, and network 295. In some implementations, on-boarding server 230, validation server 240, key generation server 250, proxy server 260, load balancer 270, verification server 280, analytics server 290, billing server 291, orchestration server 292, and policy device 293 may be associated with a network provider (e.g., a network service provider that may deliver a content file stored by origin device 220 to user device 210 via network 295) and may be implemented within one or more data centers associated with the network provider. Alternatively, some, or all of devices in environment 200 may be associated with different parties and may be located in varying locations.

User device 210 may include any device capable of communicating via a network, such as a cellular network, a long-term evolution (LTE) network, or some other network. For example, user device 210 may correspond to a mobile communication device (e.g., a smart phone or a personal digital assistant (PDA)), a portable computer device (e.g., a laptop or a tablet computer), a gaming device, or another type of device. In some implementations, user device 210 may communicate with proxy server 260 in order to receive a content file stored by origin device 220.

Origin device 220 may include a computing device, such as a server device, or a collection of server devices. In some implementations, origin device 220 may be associated with a content file owner and may store a content file (e.g., a video content file, an audio content file, etc.) for delivery to user device 210 via network 295. In some implementations, origin device 220 may communicate with on-boarding server 230 to identify a particular content file with which to provide to user device 210 via different ports corresponding to different billing tiers (e.g., to offer portions of the content file to user device 210 at different customer charge rates). In some implementations, origin device 220 may receive a key from key generation server 250 (e.g., via on-boarding server 230) and may publish the key (e.g., on a web page) to allow user device 210 to select and receive the particular content file via different ports corresponding to the different billing tiers.

On-boarding server 230 may include a computing device, such as a server device, or a collection of server devices. In some implementations, on-boarding server 230 may receive information from origin device 220 to identify a content file to deliver to user device 210 via different billing tiers. Alternatively, on-boarding server 230 may be accessible directly by an owner of origin device 220 to identify the content file to deliver to user device 210 (e.g., via a web page or some other interface associated with on-boarding server 230). In some implementations, on-boarding server 230 may provide information regarding the content file to key generation server 250 and may receive a key from key generation server 250 to provide to origin device 220. In some implementations, on-boarding server 230 may function as a primary interface between origin device 220 and the network provider to deliver the content file stored by origin device 220 to user device 210.

In some implementations, on-boarding server 230 may include a virtual element to function as physical hardware, and to serve as an interface between origin device 220 and the network provider. In some implementations, on-boarding server 230 may include multiple virtual elements such that each virtual element is associated with a respective owner of multiple origin devices 220.

Validation server 240 may include a computing device, such as a server device, or a collection of server devices. In some implementations, validation server 240 may identify network load information for delivery of a content file stored by origin device 220, may determine delivery rates for delivery of the content file to user device 210 based on the network load information, and provide information regarding the delivery rates to origin device 220 and to key generation server 250. In some implementations, validation server 240 may be located near on-boarding server 230 to allow for faster communications between validation server 240 and on-boarding server 230.

Key generation server 250 may include a computing device, such as a server device, or a collection of server devices. In some implementations, key generation server 250 may receive information regarding a content file from on-boarding server 230, and information regarding delivery rates of the content file from validation server 240. In some implementations, key generation server 250 may generate a key to identify a content file stored by origin device 220 and delivery instructions for delivery of the content file to user device 210 via network 295.

Proxy server 260 may include a computing device, such as a server device, or a collection of server devices. Additionally, or alternatively, proxy server 260 may be include a traffic routing device, such as a packet data network gateway (PGW) device or some other traffic routing device. In some implementations, proxy server 260 may receive information regarding the key from user device 210 (e.g., when user device 210 selects the key to receive a content file) and may execute delivery instructions associated with the key. For example, the delivery instructions may include instructions to provide a first portion of a content file stored by origin device 220 to user device 210 via a first port, and a second portion of the content file to user device 210 via a second port.

In some implementations, proxy server 260 may communicate with verification server 280 (e.g., via load balancer 270) to verify that user device 210 is authorized to receive the content file and to receive information regarding a port to use to deliver the content file to user device 210. In some implementations, proxy server 260 may provide data flow analytics (e.g., data transfer speeds, latency values, jitter values, etc.), associated with a particular data flow, to analytics server 290.

Proxy server 260 may also provide delivery information to billing server 291 (e.g., to identify data transferred to user device 210 by tier).

Load balancer 270 may include a computing device, such as a server device, or a collection of server devices. In some implementations, load balancer 270 may receive communications from proxy server 260 destined for verification server 280, and may route the communications across one or more verification servers 280. For example, load balancer 270 may balance network load across multiple verification servers 280 to prevent overloading one or more verification servers 280.

Verification server 280 may include a computing device, such as a server device, or a collection of server devices. In some implementations, verification server 280 may receive information regarding a key from proxy server 260, may verify user device 210 to receive a content file associated with the key, and my identify ports for proxy server 260 to use to deliver the content file to user device 210 (e.g., based on information associated with the key). In some implementations, verification server 280 may validate the key based on an expiration date associated with the key. For example, verification server 280 may determine whether the key is valid (unexpired) or invalid (expired) based on the expiration date associated with the key. In some implementations, verification server 280 may also provide instructions to proxy server 260 to cause proxy server 260 to provide a content file to user device 210. Additionally, or alternatively, verification server 280 may provide instructions to policy device 293 to apply a quality of service (QoS) policy to the connection between proxy server 260 and user device 210 (e.g., a guaranteed bit rate (GBR) policy, a maximum latency policy, a maximum jitter policy, etc.).

Analytics server 290 may include a computing device, such as a server device, or a collection of server devices. In some implementations, analytics server 290 may receive, from proxy server 260, information regarding data flow analytics (e.g., data transfer speeds, latency values, jitter values, etc.), associated with a particular data flow (e.g., delivery of a content file from origin device 220 to user device 210 via proxy server 260). In some implementations, analytics server 290 may perform a network diagnostic function based on information stored by analytics server 290 (e.g., to identify a network outage or identify connections between user device 210 and proxy server 260 which may be underperforming with respect to a performance threshold).

Billing server 291 may include a computing device, such as a server device, or a collection of server devices. In some implementations, billing server 291 may receive data usage information by tier from proxy server 260 to identify billing rates to charge to user device 210 and/or billing rates to charge to origin device 220 (e.g., in the context of the network provider delivering a content file stored by origin device 220 to user device 210). As described above, billing server 291 may charge for delivery of a content file to an account associated with user device 210 and/or to account associated with origin device 220 such that delivery costs may be shared by user device 210 and origin device 220 or may be paid entirely by either user device 210 or origin device 220.

Orchestration server 292 may include a computing device, such as a server device or a collection of server devices. In some implementations, orchestration server 292 may store data associated with the topology of on-boarding server 230. For example, orchestration server 292 may store information for a virtual element (or multiple virtual network elements) associated with on-boarding server 230, such as information associating services for an owner of origin device 220, services provided by the virtual element, a virtual IP address associated with the virtual element, and/or some other information regarding a virtual element or group of virtual elements. Orchestration server 292 may also receive an instruction from analytics server 290 to add, remove, or combine virtual network elements based on performance data associated with the virtual elements of on-boarding server 230. Further, orchestration server 292 may execute the instruction to add, remove, or combine virtual network elements based on receiving the instruction.

Policy device 293 may include a computing device, such as a server device or a collection of server devices. In some implementations, policy device 293 may store a policy instruction to apply a QoS policy to a data flow or connection between proxy server 260 and user device 210 (e.g., a guaranteed bit rate (GBR) policy, a maximum latency policy, a maximum jitter policy, etc.). Additionally, or alternatively, policy device 293 may store a policy instruction to apply a QoS policy to a data flow between other devices in environment 200 (e.g., devices relating to delivery of a content file to user device 210). In some implementations, policy device 293 may receive policy instructions from verification server 280 or from some other source.

Network 295 may include one or more wired and/or wireless networks. For example, network 295 may include a cellular network, a public land mobile network (PLMN), a second generation (2G) network, a third generation (3G) network, a fourth generation (4G) network, a fifth generation (5G) network, and/or another network. Additionally, or alternatively, network 295 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
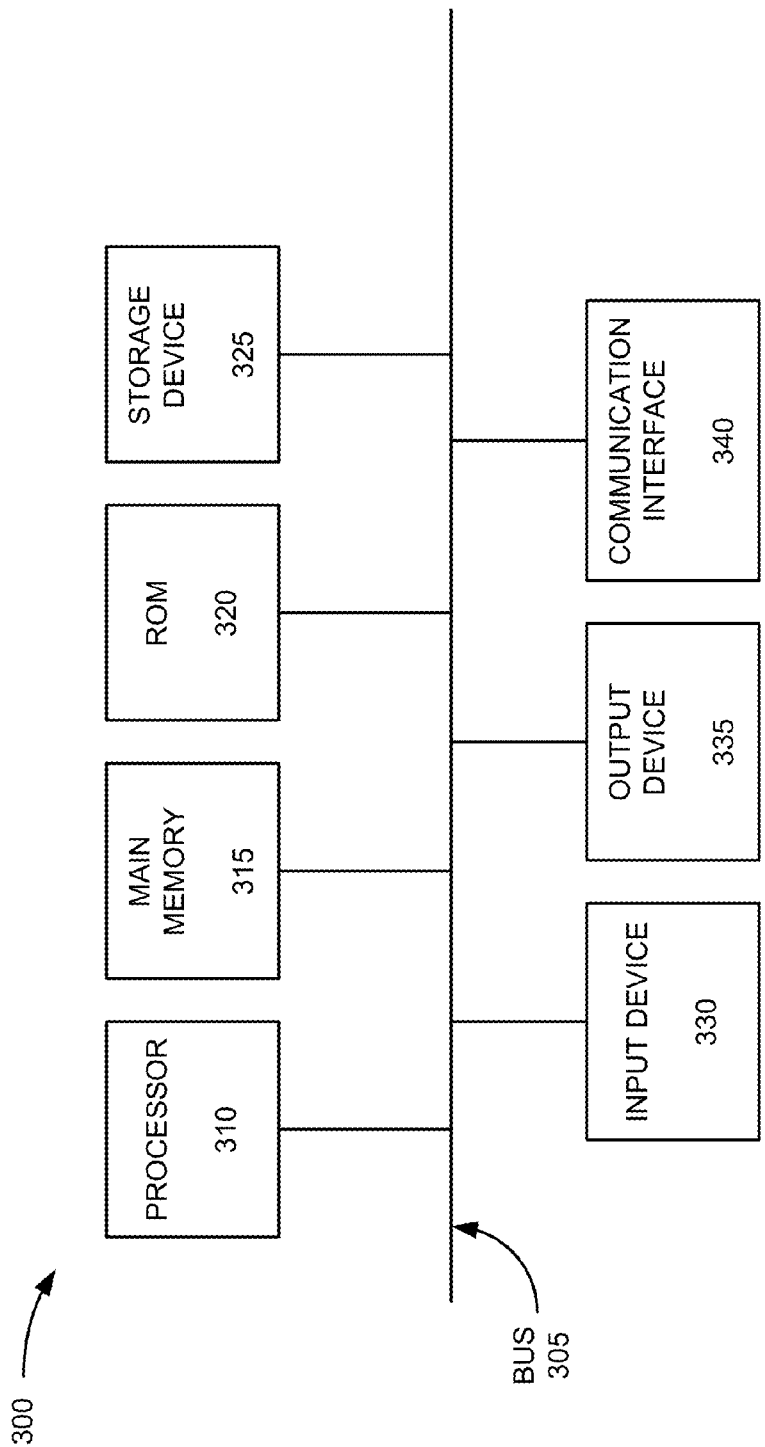
FIG. 3 illustrates example components of a device that may be used within the environment of FIG. 2.

FIG. 3 illustrates example components of a device 300 that may be used within environment 200 of FIG. 2. Device 300 may correspond to user device 210, origin device 220, on-boarding server 230, validation server 240, key generation server 250, proxy server 260, load balancer 270, verification server 280, analytics server 290, billing server 291, orchestration server 292, or policy device 293. Each of user device 210, origin device 220, on-boarding server 230, validation server 240, key generation server 250, proxy server 260, load balancer 270, verification server 280, analytics server 290, billing server 291, orchestration server 292, or policy device 293 may include one or more devices 300, and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

FIG. 4 illustrates an example data structure 400 that may be stored by one or more devices in environment 200, such as key generation server 250. In one implementation, data structure 400 may be stored in a memory of key generation server 250. In another implementation, data structure 400 may be stored in a memory separate from, but accessible by, key generation server 250. In some implementations, data structure 400 may be stored by some other device in environment 200, such as on-boarding server 230, validation server 240, proxy server 260, load balancer 270, verification server 280, analytics server 290, and/or billing server 291.

A particular instance of data structure 400 may contain different information and/or fields than another instance of data structure 400. In some implementations, information stored by data structure 400 may correspond to instructions associated with delivery of a particular content file from origin device 220 to user device 210 via proxy server 260. One instance of data structure 400 may store information regarding one device in environment 200, whereas another instance of data structure 400 may store information another device in environment 200.

As shown in FIG. 4, data structure 400 may include key ID field 410, expiration field 420, content information field 430, delivery rate field 440, and delivery instructions field 450.

Key ID field 410 may store information to uniquely identify a particular key stored by key generation server 250. For example, key ID field 410 may store a string of characters, such as "123" to identify the particular key. While a particular format of information stored by key ID field 410 is shown in FIG. 4, in practice, key ID field 410 may store information to identify a key in any format and in any length.

Expiration field 420 may store information to identify an expiration date of a particular key. For example, assume that the key associated with the key ID of "123" expires on 11/11/2012. Expiration field 420 may store the information "11/11/2012" to identify that the key associated with the key ID of "123" expires on 11/11/2012.

Content information field 430 may store information associated with a content file stored by origin device 220 and identified by on-boarding server 230 as a content file to provide to user device 210 at different customer charge rates for different portions of the content file. In some implementations, content information field 430 may store information, such as a universal resource locator (URL) for the content file and network load information for delivery of the content file, such as information regarding a file size and/or a resolution of the content file. In some implementations, content information field 430 may store additional information not shown in FIG. 4, such as a network resource demand to deliver the content file to user device 210 (e.g., a minimum GBR value, a maximum latency value, a maximum jitter value, etc.).

Delivery field 440 may store information to identify a delivery rate charged by an associated network provider of network 295 to an owner of the content file, such as an owner of origin device 220, for providing the content file from origin device 220 to user device 210. In some implementations, on-boarding server 230 and/or validation server 240 may determine the delivery rate based on information stored by content information field 430 and/or based on some other information relating to network usage for delivering the content file from origin device 220 to user device 210 (e.g., a network resource demand).

Delivery instructions field 450 may store information to identify instructions for proxy server 260 to execute in order to deliver the content file from origin device 220 to user device 210. For example, delivery instructions field 450 may store an instruction to direct proxy server 260 to deliver a first portion of the content file (e.g., a portion of the content file associated with a first time index of the content file), via a first port, via a first APN of network 295, or via a first application of user device 210 corresponding to a first customer charge value charged to an account associated with user device 210. Additionally, or alternatively, delivery instructions field 450 may store an instruction to direct proxy server 260 to present user device 210 with a web page to authorize proxy server 260 to provide the content file to user device 210 at an advertised customer charge value to be charged to the account of user device 210.

Additionally, or alternatively, delivery instructions field 450 may store an instruction to direct proxy server 260 to provide the first portion of the content file to user device 210 when the first portion of the content file is associated with a toll-free port or application (e.g., a customer charge value of zero) and to present a web page to user device 210 (e.g., to authorize proxy server 260 to provide a second portion of the content file to user device 210 at an advertised customer charge value) when delivery of the first portion of the content file concludes. Thus, the instructions may prevent the account of user device 210 from being inadvertently charged.

In some implementations, information stored by delivery instructions field 450 may be received from origin device 220. For example, an owner of origin device 220 may select the portions of the content file and associated customer charges to be billed by billing server 291 to the account of user device 210. As an example, assume that an owner of origin device 220 selects a particular content file (e.g., a movie, such as "Billy Madison"), a first portion of the particular content file (e.g., the first minute of the particular content file), and a customer charge value of zero associated with the first portion of the particular content file. That is, the owner of origin device 220 may select to provide the first portion of the particular content file to user device 210 free-of-charge such that billing server 291 may charge an account of origin device 220 at the delivery rate stored by delivery rate field 440 and may not charge the account of user device 210. In this example, delivery instructions field 450 may store a first time index of 00:00:00-00:01:00, a customer charge value of $0.00 (e.g., a toll-free customer charge rate), and a port value of 1 corresponding to the port used to deliver the first portion of the particular content file to user device 210 and corresponding to the customer charge value of $0.00.

Thus, a content file (or portion of the content file) provided to user device 210 at the toll-free customer charge rate may be accessed by user device 210 via a toll-free port of a network device associated with a network provider, or via a toll-free application such that billing server 291 may not charge an account of user device 210. For example, billing server 291 may not count data packets, associated with the content file, transferred to and/or from user device 210. Alternatively, billing server 291 may deduct the data packets transferred to and/or from user device 210 from a data packets usage log associated with user device 210, such that the account of user device 210 may not be charged when receiving the data packets, associated with the content file.

Continuing with the above example, assume that the owner of origin device 220 identifies a second portion of the particular content file (e.g., a portion relating to the time index of 00:01:01-01:30:00) and a customer charge value of $0.025/min. That is, the owner of origin device 220 selects to provide the second portion of the particular content file to user device 210 at a billing rate of $0.025/min such that billing server 291 may charge the account of user device 210 at the billing rate. In this example, delivery instructions field 450 may store the time index of 00:01:01-01:30:00, the customer charge value of $0.025/min and a port value of 2 corresponding to the customer charge value.

In some implementations, delivery instructions field 450 may store additional instructions not shown in FIG. 4. For example, delivery instructions field 450 may store instructions for policy device 293 to apply a QoS policy to a connection between user device 210 and proxy server 260 (e.g., a minimum GBR value, a maximum latency value, a maximum jitter value, etc.), such that proxy server 260 may provide a particular level of QoS when delivering the content file.

While particular fields are shown in a particular format in FIG. 4, in practice, data structure 400 may include additional fields, fewer fields, different fields, or differently arranged fields than are shown in FIG. 4. For example, data structure 400 may store an identifier associated with an owner of origin device 220, an identifier for user device 210, authorization information to identify whether user device 210 is authorized to receive a particular content file, a number of times that a particular user device 210 is authorized to receive a particular content file, and/or some other information.

Figure 5A:
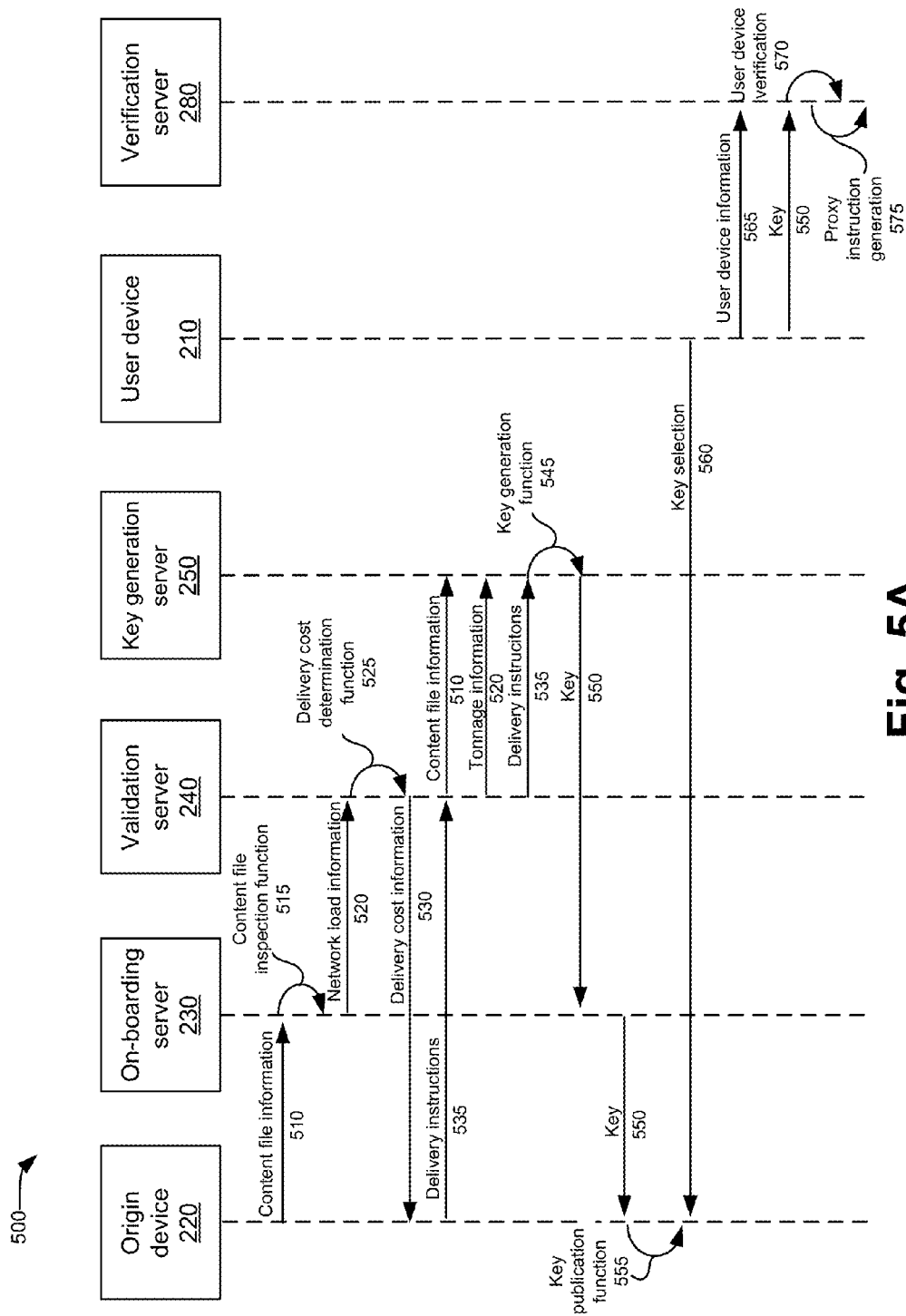
FIGS. 5A-5B illustrate call flow diagrams of example operations capable of being performed by example portions of the environment of FIG. 2.
Figure 5B:
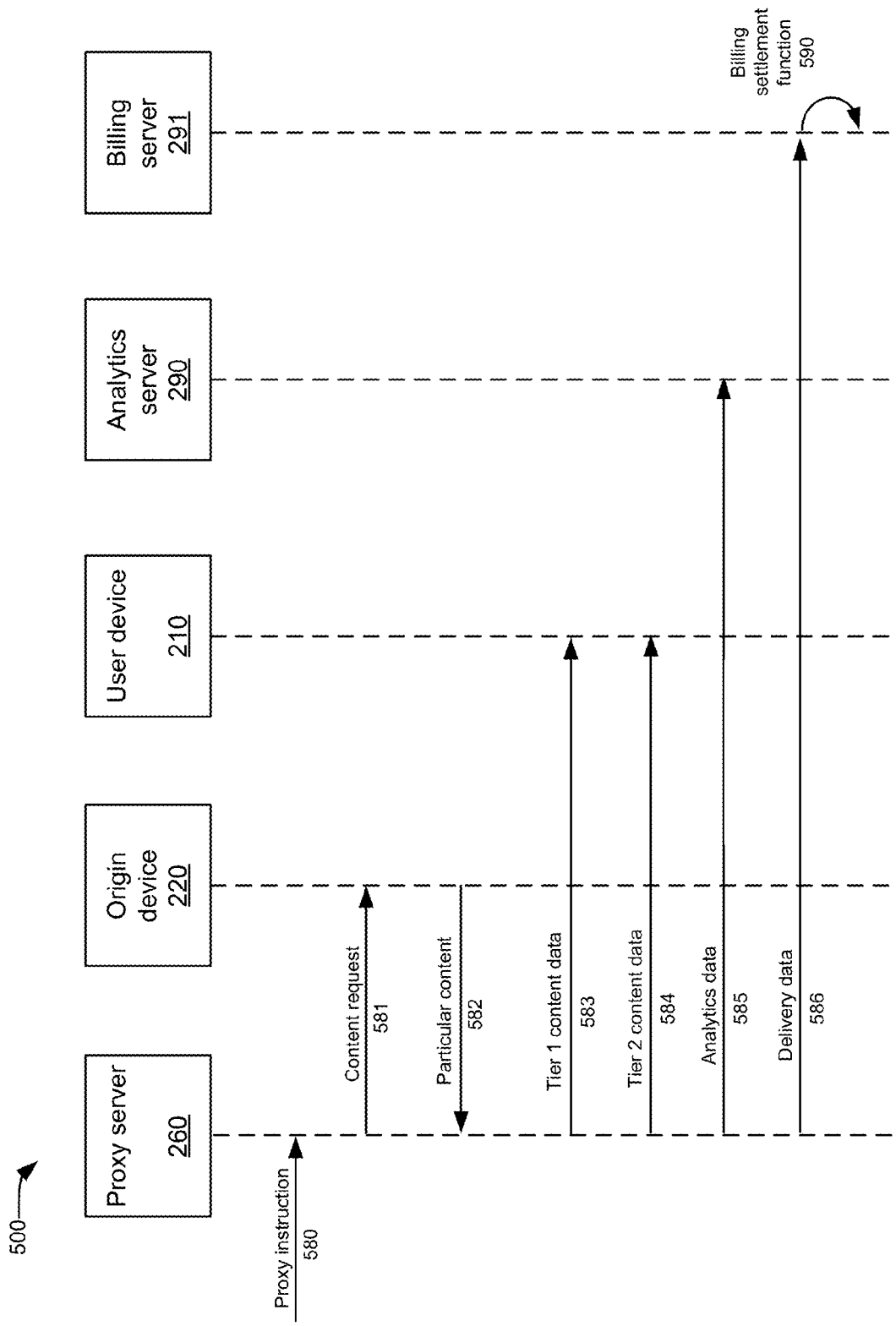

FIGS. 5A-5B illustrate call flow diagrams of example operations capable of being performed by an example portion 500 of environment 200. As shown in FIGS. 5A-5B, portion 500 may include user device 210, origin device 220, on-boarding server 230, validation server 240, key generation server 250, proxy server 260, verification server 280, analytics server 290, and billing server 291. User device 210, origin device 220, on-boarding server 230, validation server 240, key generation server 250 proxy server 260, verification server 280, analytics server 290, and billing server 291 may include components and/or perform functions described above in connection with, for example, one or more of FIGS. 1-3. FIGS. 5A-5B may correspond to example operations to identify content files or multiple portions of a content file to deliver from origin device 220 to user device 210 at different customer charge rates.

In FIGS. 5A-5B, assume that an owner of origin device 220 selects a particular content file to provide to user device 210 via network 295 such that delivery for portions of the particular content file is billed to an account of user device 210 and/or to an account of origin device 220. In some implementations, origin device 220 may provide content file information 510 corresponding to the particular content file. For example, content file information 510 may include a URL of the particular content file, an identifier of the particular content file (a movie name, a song name, etc.), the type of the particular content file (e.g., a stored content file or a real-time streaming content file), an internet protocol (IP) address of the particular content file, metadata associated with the particular content file, an internet domain associated with the particular content file, and/or some other information regarding the particular content file.

As shown in FIG. 5A, on-boarding server 230 may perform content file inspection function 515 to determine network load information for delivery of the particular content file (e.g., a file size, a resolution, a playback bit rate, etc.). For example, on-boarding server 230 may download the particular content file from origin device 220 to determine the network load information or may download a sample portion of the particular content file (e.g., when the particular content file is a real-time streaming file) to determine network load per time unit (e.g., 100 kilobits per second (kbps)).

In some implementations, on-boarding server 230 may provide network load information 520 to validation server 240 based on performing content file inspection function 515. Validation server 240 may perform delivery cost determination function 525 based on receiving network load information 520 to calculate a delivery cost to charge to an account associated with origin device 220 for delivering the particular content file from origin device 220 to user device 210. For example, the delivery cost may be a function of the network load and may relate to a network resource demand to deliver the particular content file. In some implementations, the delivery cost may be determined in terms of price per byte of particular content file data delivered, price per minute of particular content file delivered, or the like.

As an example, validation server 240 may determine a delivery cost of $0.015 per minute (e.g., a cost of $0.015 to deliver each minute of the particular content file) or a delivery cost of $0.01 per megabyte (e.g., a cost of $0.01 to deliver one megabyte of the particular content file). In another example (e.g., when the network load for delivery of the particular content file is higher than in the preceding example), validation server 240 may determine a delivery cost of $0.03 per minute or a delivery cost of $0.02 per megabyte.

As shown in FIG. 5A, validation server 240 may generate delivery cost information 530 based on performing delivery cost determination function 525 and may provide delivery cost information 530 to origin device 220. Additionally, delivery cost information 530 may be stored by data structure 400. In some implementations, origin device 220 may select delivery instructions 535 to identify portions of the particular content file that may be provided to user device 210 and associated charges to charge to an account of user device 210 when user device 210 receives the portions of the particular content file (e.g., such that the delivery cost may be shared by the account of origin device 220 and by the account of user device 210 or such that the account of origin device 220 may receive a profit when the customer charge exceeds the delivery cost). In some implementations, delivery instructions 535 may be associated with information stored by data structure 400. Delivery instructions 535 may also include an expiration date and/or user device 210 information to identify user devices 210 authorized to receive the particular content file. As shown in FIG. 5A, origin device 220 may provide delivery instructions 535 to validation server 240 (e.g., via on-boarding server 230).

As further shown in FIG. 5A, validation server 240 may provide content file information 510, network load information 520, and delivery instructions 535 to key generation server 250. Validation server 240 may also provide authorization information to key generation server 250. In some implementations, key generation server 250 may perform key generation function 545 to generate key 550 based on receiving content file information 510, network load information 520, delivery instructions 535 and/or some other information relating to key 550. For example, key generation server 250 may hash content file information 510, network load information 520, and delivery instructions 535 together to generate key 550. As described above with respect to data structure 400, key 550 may identify the particular content file, user devices 210 which are authorized to receive the particular content file, a delivery rate charged to the account of origin device 220, customer charge rates charged to the account of user device 210 for delivery of different portions of the particular content file, the authorization information, and/or QoS policies associated with the delivery of the particular content file. In some implementations, key generation server 250 may provide key 550 to origin device 220 (e.g., via on-boarding server 230).

As further shown in FIG. 5A, origin device 220 may perform key publication function 555 based on receiving key 550. For example, origin device 220 may publish key 555 as a link to a Java applet on a web page associated with origin device 220 (e.g., a web page advertising the particular content file). Additionally, or alternatively, origin device 220 may publish key 550 using some other technique.

In some implementations, user device 210 may select the link, associated with key 550, in order to request the content file associated with key 550. User device 210 may provide origin device 220 with key selection 560 (e.g., when a user of user device 210 selects the link associated with key 550). In some implementations, user device 210 may receive selection instructions based on selecting key 550 and may provide user device information 565 and key 550 to verification server 280 (e.g., via proxy server 260 and/or load balancer 270) based on executing the selection instructions. In some implementations, user device information 565 may include authorization information (e.g., a username and password), a mobile device number associated with user device 210, an international mobile equipment identity (IMEI) number associated with user device 210, or some other information associated with user device 210.

As shown in FIG. 5A, verification server 280 may perform user device verification function 570 to authorize user device 210 to receive the particular content file based on information stored by key 550. For example, verification server 280 may verify that user device information 565 matches the authorization information stored by key 550. In some implementations, user device verification function 570 may also determine whether key 550 is valid based on a current date and information regarding an expiration date stored by key 550. User device verification function 570 may also determine whether key 550 is valid based on authorization information stored by key 550 and based on authorization information provided as part of user device information 565. Additionally, or alternatively, verification server 280 may authorize user device 210 based on verifying user device information 565 against authorization information stored by verification server 280.

Verification server 280 may also execute proxy instruction generation function 575 based on performing user device verification function 570 and based on delivery instructions stored by key 550. In some implementations, and as described above, proxy instruction generation function 575 may generate an instruction to cause proxy server 260 to deliver a particular portion of the particular content file (e.g., a portion of the particular content file associated with a particular time index of the particular content file), via a particular port, a particular APN of network 295, or a particular application of user device 210 corresponding to a particular customer charge value charged to an account associated with user device 210. Additionally, or alternatively, the instruction may direct proxy server 260 to present user device 210 with a web page to authorize proxy server 260 to provide the content file to user device 210 at an advertised customer charge value to be charged to the account of user device 210.

Additionally, or alternatively, the instruction may direct proxy server 260 to provide the first portion of the content file to user device 210 when the first portion of the content file is associated with a toll-free port, APN, or application (e.g., a customer charge value of zero) and to present a web page to user device 210 (e.g., to authorize proxy server 260 to provide a second portion of the content file to user device 210 at an advertised customer charge value) when the time index of the first portion of the content file concludes. Additionally, or alternatively, the instruction may direct policy device 293 to implement a QoS policy to a connection between user device 210 and proxy server 260 relating to data flow for delivery of the particular content file. In some implementations, verification server 280 may generate proxy instruction 580 based on executing proxy instruction generation function 575.

Continuing to FIG. 5B, proxy server 260 may receive proxy instruction 580 from verification server 280. In FIG. 5B, assume that proxy instruction 580 includes an instruction to provide user device 210 with portions of the particular content file at different customer charge rates for different portions. Given this assumption, proxy server 260 may provide content file request 581 to origin device 220 (e.g., by accessing the particular content file via a URL of the particular content file). Origin device 220 may provide particular content file 582 corresponding to content file request 581 and corresponding to the particular content file associated with key 550. Further, proxy server 260 may provide a first portion of the particular content file (e.g., tier 1 content data 583) and a second portion of the particular content file (e.g., tier 2 content data 584) to user device 210. As described above, tier 1 content data may relate to a first customer charge and tier 2 may relate to a second customer charge. For example, proxy server 260 may provide tier 1 content data 583 via a first port, a first APN, or a first application of user device 210, and may provide tier 2 content data 584 via a second port, a second APN, or a second application of user device 210. While only two tiers are shown in FIG. 5B, in practice, any number of tiers may be applied to any number of portions of the particular content file.

As further shown in FIG. 5B, proxy server 260 may provide, to analytics server 290, analytics data relating to a network performance of delivery of the particular content file (e.g., tier 1 content data 583 and/or tier 2 content data 584). As described above, network diagnostics and/or network troubleshooting may be based on information stored by analytics server 290.

As further shown in FIG. 5B, proxy server 260 may provide delivery data 586 to billing server 291. In some implementations, delivery data 586 may identify the portions of the particular content file delivered to user device 210 and the ports and/or applications used to deliver the particular content file. For example, delivery data 586 may identify that a first port (e.g., a port corresponding to tier 1 content data 583 and corresponding to a first customer charge rate) was used to deliver a particular number of minutes of the particular content file or a particular number of bytes of the particular content file. Continuing with the above example, delivery data 586 may identify that a second port (e.g., a port corresponding to tier 2 content data 584 and corresponding to a second customer charge rate) was used to deliver a particular number of minutes of the particular content file or a particular number of bytes of the particular content file. Delivery data 586 may also identify the owner of origin device 220 (e.g., the content file owner of the delivered particular content file) to identify a billing rate to charge to an account of origin device 220.

As further shown in FIG. 5B, billing server 291 may perform billing settlement function 590 to distribute charges, associated with the delivery of the particular content file, to respective accounts. For example, based on information associated with delivery data 586, billing server 291 may store information to debit the account of origin device 220 for delivery of the particular content file to user device 210. Additionally, or alternatively, billing server 291 may store information to debit the account of user device 210 for delivery of the particular content file to user device 210 based on the customer charge rates.

As an example, assume that user device 210 receives a first portion of the particular content file (e.g., tier 1 content file data 583) and that the customer charge rate for the first portion of the particular content file is $0 per minute (e.g., a toll-free customer charge rate). Further assume that the delivery charge rate (e.g., an amount charged to the account of origin device 220 for delivery of the first portion of the particular content file) is $0.015 per minute and that the first portion of the particular content file is one minute in length. Given these assumptions, billing server 291 may debit the account of origin device 220 an amount of $0.015 and may credit an account of the network provider in the amount of $0.015.

In another example, assume that user device 210 receives a second portion of the particular content file (e.g., tier 2 content file data 584) and that the customer charge rate for the second portion of the particular content file is $0.025 per minute (e.g., a toll-paid customer charge rate). Further assume that the delivery charge rate is $0.015 per minute and that the second portion of the particular content file is 90 minutes in length and was delivered to user device 210 in its entirety. Given these assumptions, billing server 291 may debit the account of user device 210 in the amount of $2.25 (i.e., 90 minutes*$0.025) and credit the account of origin device 220 by the amount of $2.25 (i.e., the amount debited from the account of user device 210). Further, user device 210 may debit the account of origin device 220 in the amount of $1.35 (i.e., 90 minutes*$0.015) for delivery of the second portion of the content file and may credit the account of the network provider by the amount of $1.35 (i.e., the amount debited from the account of origin device 220).

In some implementations, user device 210 may receive the particular content file independently of proxy server 260. For example, assume that key 550 includes delivery instructions to provide the particular content file in its entirety via a toll-free customer charge port or application. Given this assumption, verification server 280 may provide user device 210 with information used to allow user device 210 to receive the particular content file independently of proxy server 260. For example, verification server 280 may provide user device 210 with a URL associated with the particular content file, authorization information to provide to origin device 220 to receive the particular content file, and information regarding a port (e.g., a toll-free port) that user device 210 may use to receive the particular content file.

While a particular series of operations and/or data flows have been described above with regard to FIGS. 5A-5B the operations and/or data flows and/or the order of the operations and/or data flows may be modified in other implementations. Further, non-dependent operations and/or data flows may be performed in parallel.

Figure 6:
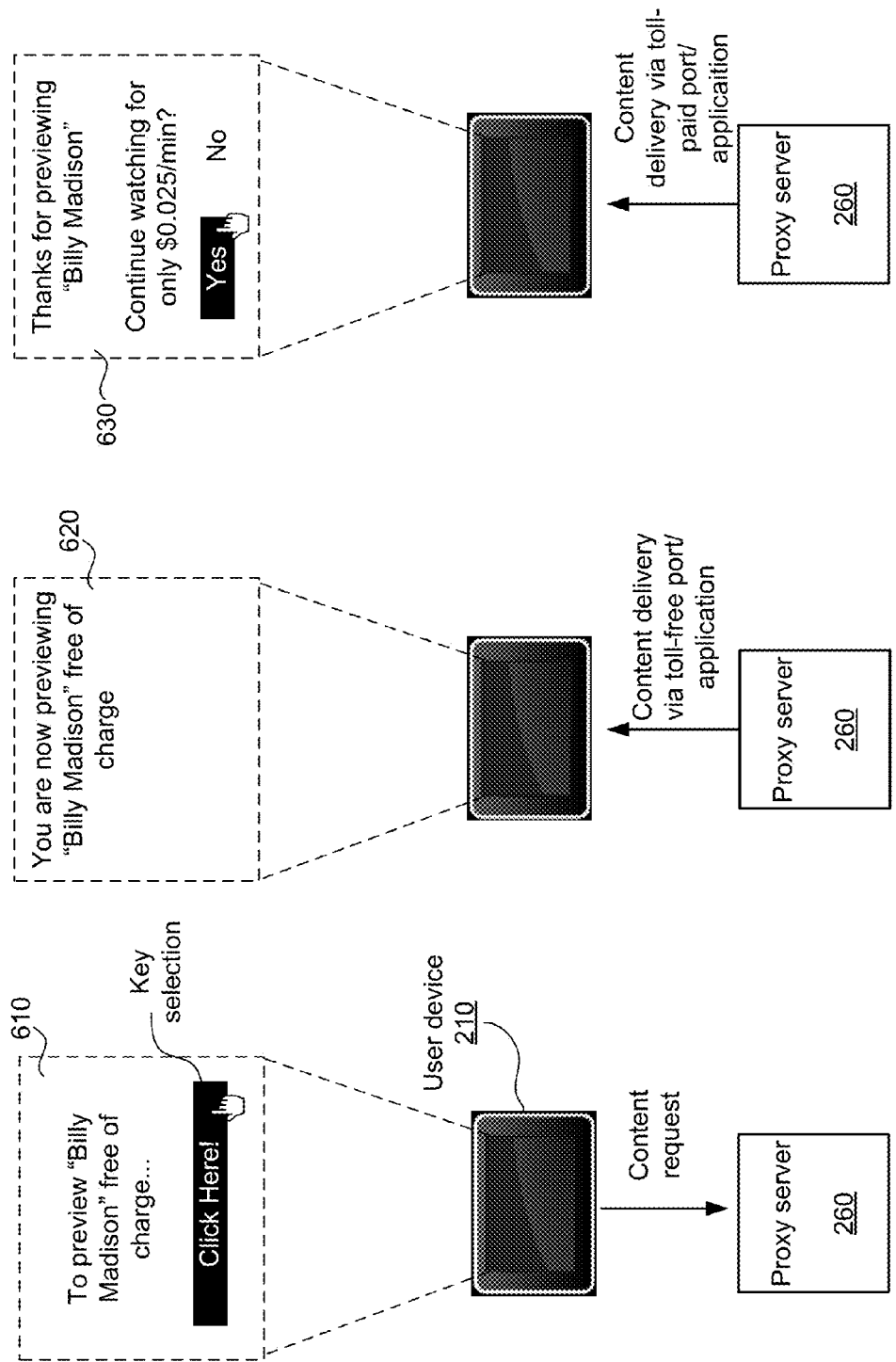
FIG. 6 illustrates an example implementation as described herein.

FIG. 6 illustrates an example implementation as described herein. In some implementations, FIG. 6 may correspond to user device 210 receiving a first portion of particular content file at a first customer charge rate and receiving a second portion of the particular content file at a second customer charge rate.

As shown in FIG. 6, assume that a user of user device 210 selects to receive a first portion of a particular content file (e.g., a movie entitled "Billy Madison") by selecting a key in the form of a link on a web page associated with origin device 220 (e.g., as shown in interface 610). Further, assume that the selection of the key causes user device 210 to provide the key and user device information to verification server 280, as described above. Further, assume that the selection of the key causes user device 210 to request the first portion of the particular content file from proxy server 260 via verification server 280. Further, assume that the first portion of the particular content file is associated with a customer charge rate of $0 per minute. Given the above assumptions, proxy server 260 may provide user device 210 with the first portion of the particular content file via a toll-free port or a toll-free application such that an account of user device 210 may not be charged for receiving the first portion of the particular content file (e.g., as shown in interface 620).

As further shown in FIG. 6, assume that delivery of the first portion of the particular content file concludes (e.g., as shown in interface 630). In some implementations, proxy server 260 may present a web page to user device 210 to allow a user of user device 210 to select to receive a second portion of the particular content file at an advertised customer charge rate. In FIG. 6, assume that the user of user device 210 selects to receive the second portion of the particular content file (e.g., by selecting a link to request the second portion of the particular content file). Given this assumption, proxy server 260 may deliver the second portion of the particular content file via a toll-paid port or toll-paid application.

In some implementations, proxy server 260 may provide an entire first particular content file to user device 210 via a toll-free port or toll-free application and may provide a second particular content file to user device 210 via a toll-paid port or toll-paid application. For example, assume that in the example above, the first portion of the particular content file is a first content file and that the second portion of the particular content file is a second content file. Proxy server 260 may provide the first content file in its entirety via a toll-free port or toll-free application, and may present user device 210 (e.g., as shown in interface 630) with an option to select to view the second content file at an advertised rate using a toll-paid port or a toll-paid application.

While a particular example is shown in FIG. 6, it will be apparent that the above description is merely an example implementation. For example, the devices and/or processes involved in the example implementation is not to be limited to what is shown and may include other devices and/or processes, such as devices and/or processes shown in FIGS. 2 and 5A-5B.

As described above, a content owner (e.g., an owner of content stored by origin device 220) may offer to provide particular content (or portions of the particular content) to the user device at different customer charge rates for each particular content or each portion of particular content (e.g., a toll-free customer charge rate to user device 210 such that the delivery is paid by the content owner as part of a promotion, or a toll-paid customer charge rate to user device 210 such that the content owner receives a profit when the toll-paid customer charge rate exceeds the delivery rate charged by the network provider to the content owner). Further, billing server 291 may serve as a central billing settlement system to receive delivery data and to distribute delivery charges to appropriate accounts.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method performed by one or more servers, the method comprising:
    receiving, by the one or more servers, information regarding a content file stored by a device;
    providing, by the one or more servers and to the device, information associated with a first cost value,
        the first cost value corresponding to a cost to deliver the content file from the device to a user device via a network associated with a network provider;
    receiving, by the one or more servers, a delivery instruction,
        the delivery instruction directing the one or more servers to provide a portion of the content file to the user device via one or more ports or via one or more access points of the network,
            each of the one or more ports or the one or more access points being associated with a respective one or more second cost values;
    generating, by the one or more servers, a key associated with the information regarding the content file and with the delivery instruction;
    receiving, by the one or more servers and from the user device, an indication of a selection of the key by the user device; and
    delivering, by the one or more servers and to the user device, the portion of the content file via the one or more ports or the one or more access points based on receiving the indication of the selection of the key.

2. The method of claim 1, further comprising:
    storing information regarding delivery of the portion of the content file to the user device to identify the one or more ports or the one or more access points used to deliver the portion of the content file and to identify a particular second cost value, of the one or more respective second cost values, associated with delivery of the portion of the content file; and
    performing a billing settlement function, when the first portion of the content file or the second portion of the content file is delivered to the user device, to assess a first debit transaction, corresponding to the first cost value, to an account associated with the device, assess a first credit transaction, corresponding to the first cost value, to an account associated with the network provider, assess a second debit transaction, corresponding to the particular second cost values, to an account associated with the user device, or assess a second credit transaction, corresponding to the particular second cost value, to the account associated with the device.

3. The method of claim 1, further comprising:
    inspecting the content file;
    determining network load information for delivery of the content file based on inspecting the content file; and
    determining the first cost value based on determining the network load information,
    where providing the information regarding the first cost value is based on determining the first cost value.

4. The method of claim 3, further comprising:
    determining a policy to apply to a data flow associated with delivery of the portion of the content file to the user device,
        the policy being determined based on the network load information,
    applying the policy to the data flow to provide a particular level of quality of service to the data flow.

5. The method of claim 1, where one of the one or more second cost values is greater than zero, the method further comprising:
    presenting an option to the user device to receive the portion of the content file; and
    receiving, from the user device, an indication of a selection to receive the portion of the content file;
    where delivering, to the user device, the portion of the content file is based on receiving the indication of the selection to receive the portion of the content file.

6. The method of claim 1, further comprising:
    storing analytics data of a data flow associated with delivery of the portion of the content file to the user device; and
    performing a network diagnostic function based on the analytics data,
        the network diagnostic function identifying a network outage when the analytics data does not satisfy a particular performance threshold.

7. The method of claim 1, further comprising:
    receiving information regarding the user device; and
    verifying that the user device is authorized to receive the portion of the content file based on receiving the information regarding the user device,
    where delivering the portion of the content file is based on verifying that the user device is authorized to receive the portion of the content file.

8. A system comprising:
    one or more servers to:
        receive information regarding a content file stored by a device;
        provide, to the device, information associated with a first cost value,
            the first cost value corresponding to a cost to deliver the content file from the device to a user device via a network associated with a network provider;
        receive a delivery instruction,
            the delivery instruction directing the one or more servers to provide a portion of the content file to the user device via one or more ports or via one or more access points of the network,
                each of the one or more ports or the one or more access points being associated with a respective second cost value of one or more second cost values;
        generate a key associated with the information regarding the content file and with the delivery instruction;
        receive, from the user device, an indication of a selection of the key by the user device;
        receive information regarding the user device;
        verify that the user device is authorized to receive the portion of the content file based on receiving the information regarding the user device; and
        deliver, to the user device, the portion of the content file via the one or more ports or the one or more access points based on receiving the indication of the selection of the key and verifying that the user device is authorized to receive the portion of the content file.

9. The system of claim 8, where the one or more servers are further to:
    store information regarding delivery of the portion of the content file to the user device to identify the one or more ports or the one or more access points used to deliver the portion of the content file and to identify a particular second cost value, of the one or more respective second cost values, associated with delivery of the portion of the content file; and perform a billing settlement function, when the first portion of the content file or the second portion of the content file is delivered to the user device, to assess a first debit transaction, corresponding to the first cost value, to an account associated with the device, assess a first credit transaction, corresponding to the first cost value, to an account associated with the network provider, assess a second debit transaction, corresponding to the particular second cost values, to an account associated with the user device, or assess a second credit transaction, corresponding to the particular second cost value, to the account associated with the device.

10. The system of claim 9, where the one or more servers are further to:
inspect the content file;
determine network load information for delivery of the content file based on inspecting the content file; and
determine the first cost value based on determining the network load information,
where when providing the information regarding the first cost value, the one or more servers are further to provide the information regarding the first cost value based on determining the first cost value.

11. The system of claim 10, where the one or more servers are further to:
determine a policy to apply to a data flow associated with delivery of the portion of the content file to the user device,
the policy being determined based on the network load information,
apply the policy to the data flow to provide a particular level of quality of service to the data flow.

12. The system of claim 9, where one of the one or more second cost values is greater than zero, and the one or more servers are further to:
present an option to the user device to receive the portion of the content file; and
receive, from the user device, an indication of a selection of the option to receive the portion of the content file;
where when delivering the portion of the content file, the one or more servers are further to deliver the portion of the content file based on receiving the indication of the selection of the option to receive the portion of the content file.

13. The system of claim 9, where the one or more servers are further to:
store analytics data of a data flow associated with delivery of the portion of the content file to the user device; and
perform a network diagnostic function based on the analytics data,
the network diagnostic function identifying a network outage when the analytics data does not satisfy a particular performance threshold.

14. A computer-readable medium for storing instructions, the instructions comprising:
a plurality of instructions which, when executed by one or more processors associated with one or more servers, cause the one or more processors to:
receive information regarding a content file stored by a device;
determine a first cost value associated with a first portion of the content file;
determine a second cost value associated with a second portion of the content file;
receive a delivery instruction,
the delivery instruction directing the one or more servers to deliver, to a user device, the first portion of the content file via a first port or a first access point of a network, and deliver the second portion of the content file via a second port or a second access point of the network,
the first port or the first access point being associated with the first cost value,
the second port or the second access point being associated with the second cost value;
generate a key associated with the information regarding the content file and with the delivery instruction;
receive, from the user device, an indication of selection of the key; and
deliver, to the user device, the first portion of the content file via the first port or the first access point, based on receiving the indication of the selection of the key; and
deliver, to the user device, the second portion of the content file via the second port or the second access point, based on receiving the indication of the selection of the key.

15. The computer-readable medium of claim 14, where the plurality of instructions further cause the one or more processors to:
determine network load information for delivery of the first portion of the content file; and
determine network load information for delivery of the second portion of the content file;
where one or more instructions, of the plurality of instructions, to determine the first cost value further cause the one or more processors to determine the first cost value based on determining the network load information for the first portion of the content file, and
where one or more instructions, of the plurality of instructions, to determine the second cost value further cause the one or more processors to determine the second cost value based on determining the network load information for the second portion of the content file.

16. The computer-readable medium of claim 14, where the plurality of instructions further cause the one or more processors to:
store information regarding delivery of the first portion of the content file and the second portion of the content file to the user device; and
perform a billing settlement function, when the first portion of the content file or the second portion of the content file is delivered to the user device, to assess a first credit transaction, corresponding to the first cost value, to an account associated with a network provider or assess a second credit transaction, corresponding to the second cost value, to the account associated with the network provider.

17. The computer-readable medium of claim 14, where the plurality of instructions further cause the one or more processors to:
determine a first policy to apply to a first data flow associated with delivery of the first portion of the content file to the user device,
the first policy being determined based on network load information associated with the first portion of the content file;
apply the first policy to the first data flow to provide a particular level of quality of service to the first data flow;
determine a second policy to apply to a second data flow associated with delivery of the second portion of the content file to the user device, the second policy being determined based on network load information associated with the second portion of the content file; and apply the second policy to the second data flow to provide a particular level of quality of service to the second data flow

18. The computer-readable medium of claim 14, where the first cost value is greater than zero, and the plurality of instructions further cause the one or more processors to:

present an option to the user device to receive the first portion of the content file; and receive, from the user device, an indication of selection to receive the first portion of the content file, where one or more instructions, of the plurality of instructions, to deliver the first portion of the content file, further cause the one or more processors to deliver the first portion of the content file based on receiving the indication of selection to receive the first portion of the content file.

19. The computer-readable medium of claim 14, where the plurality of instructions further cause the one or more processors to:

store analytics data of a data flow associated with delivery of the first portion or the second portion of the content file to the user device; and perform a network diagnostic function based on the analytics data, the network diagnostic function identifying a network outage when the analytics data does not satisfy a particular performance threshold.

20. The computer-readable medium of claim 14, where the plurality of instructions further cause the one or more processors to:

receive information regarding the user device; and verify that the user device is authorized to receive the first portion of the content file based on receiving the information regarding the user device, where one or more instructions, of the plurality of instructions, to deliver the first portion of the content file further cause the one or more processors to deliver the first portion of the content file based on verifying that the user device is authorized to receive the first portion of the content file.

\* \* \* \* \*